Figure 1:
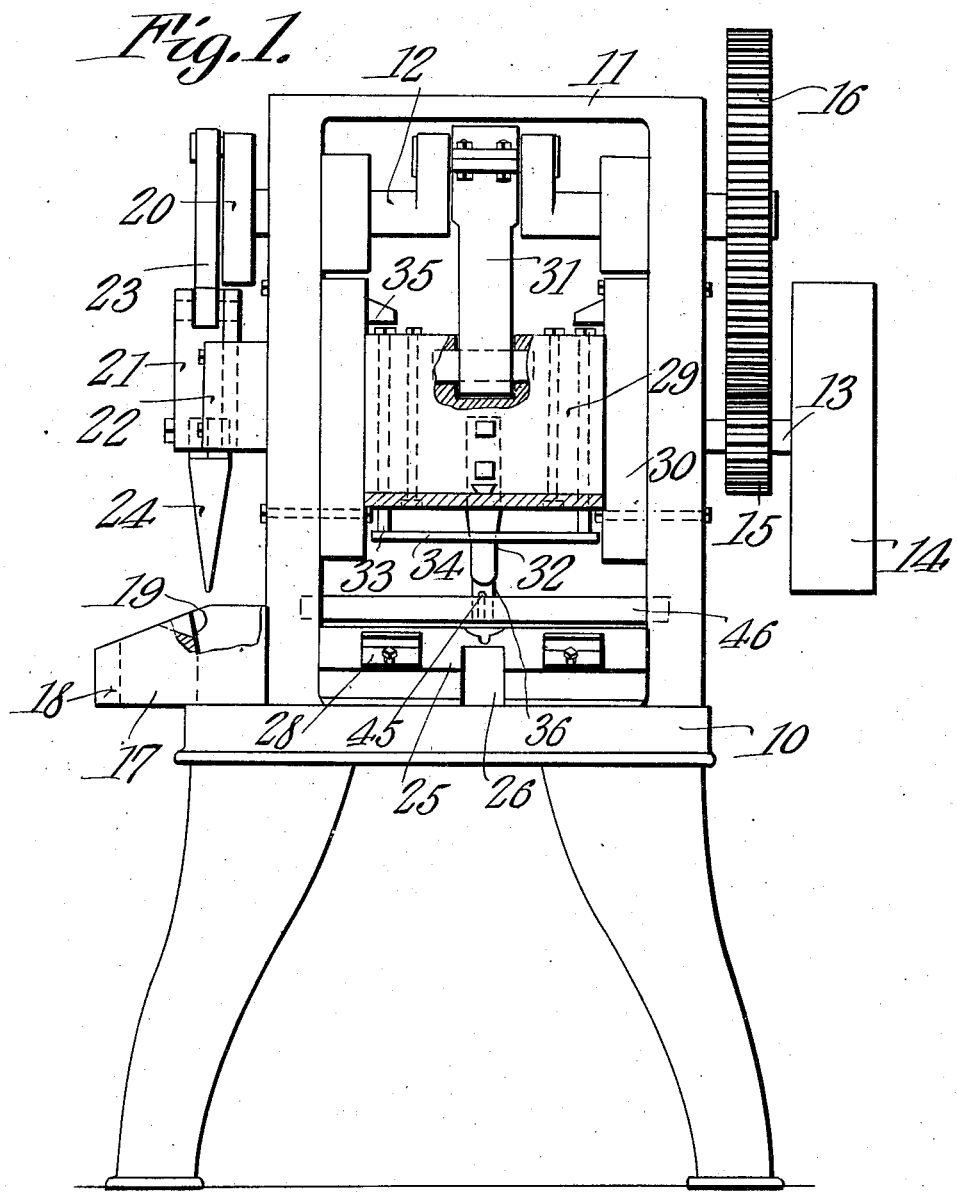

E. P. ALEXANDER.
METHOD OF MANUFACTURING HOES.
APPLICATION FILED APR. 5, 1910.

1,014,432.

Patented Jan. 9, 1912.

3 SHEETS—SHEET 1.

Witnesses
E. W. Stewart
A. Easterday

Inventor
Elmer P. Alexander.
By C. A. Snow & Co.
Attorneys

E. P. ALEXANDER.
METHOD OF MANUFACTURING HOES.
APPLICATION FILED APR. 5, 1910.
1,014,432.
Patented Jan. 9, 1912.
3 SHEETS—SHEET 2.
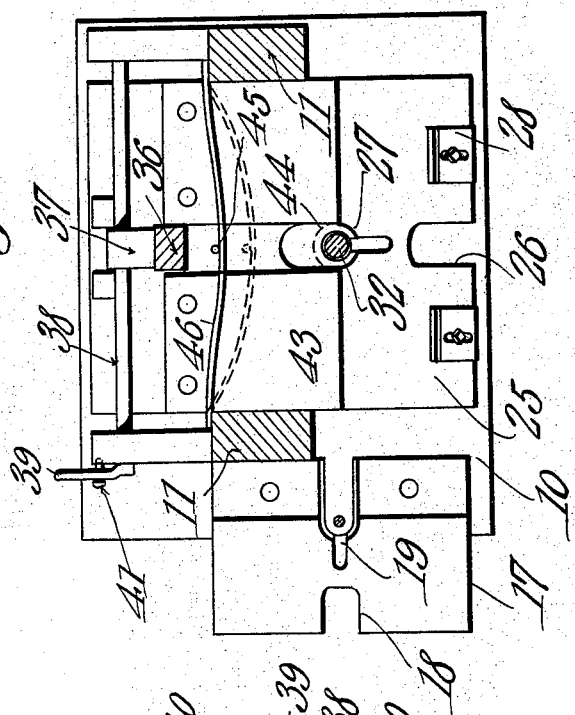
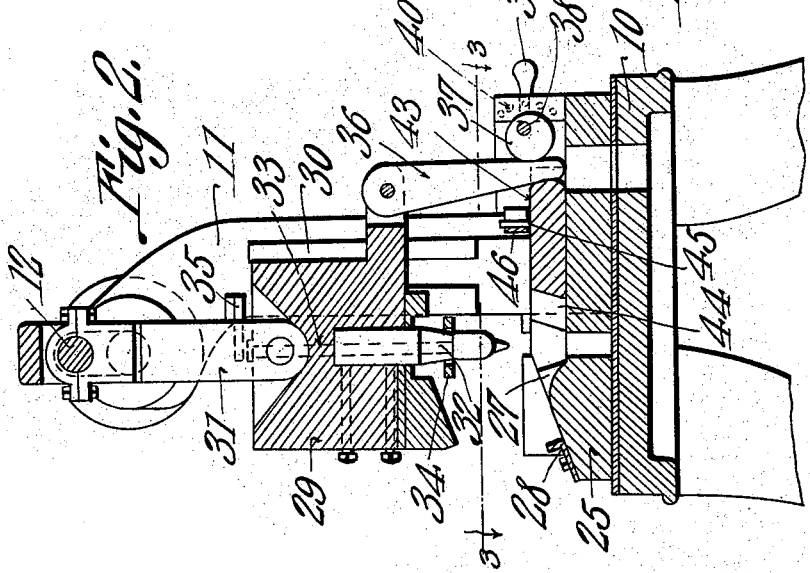

E. P. ALEXANDER.
METHOD OF MANUFACTURING HOES.
APPLICATION FILED APR. 5, 1910.
1,014,432.
Patented Jan. 9, 1912.
3 SHEETS—SHEET 3.
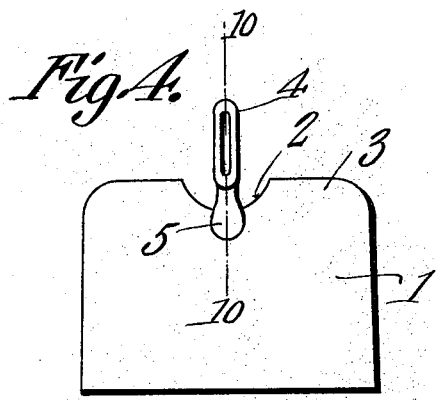
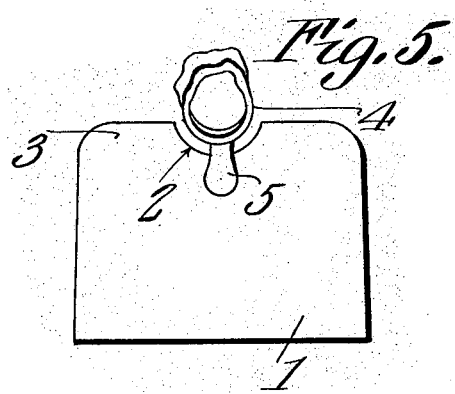
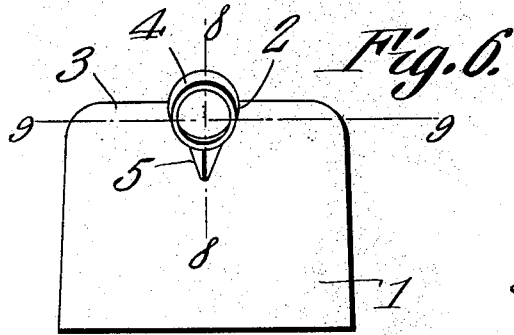
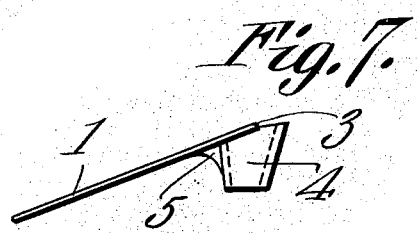
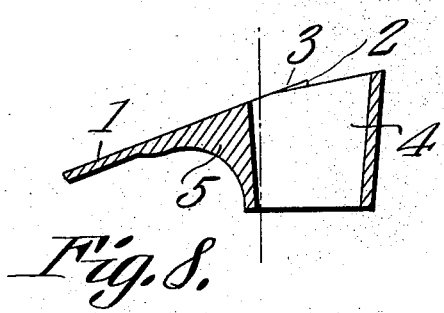
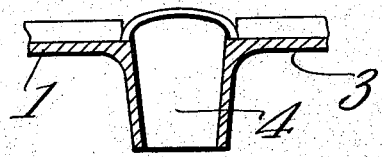
Witnesses
E. J. Stewart
A. Easterday
Inventor
Elmer P. Alexander.
By C. A. Snow & Co.
Attorneys

UNITED STATES PATENT OFFICE.

ELMER P. ALEXANDER, OF LEWISTOWN, PENNSYLVANIA.

METHOD OF MANUFACTURING HOES.

1,014,432.  Specification of Letters Patent.  Patented Jan. 9, 1912.

Application filed April 5, 1910. Serial No. 553,505.

*To all whom it may concern:*

Be it known that I, ELMER P. ALEXANDER, a citizen of the United States, residing at Lewistown, in the county of Mifflin and State of Pennsylvania, have invented a new and useful Method of Manufacturing Hoes, of which the following is a specification.

This invention relates to the art of manufacturing hoes and similar devices.

The object of the present invention is to overcome the defects of prior processes of manufacturing hoes and to provide a method by means of which the hoe eyes may be properly set, shaped, backed up and otherwise firmly connected with the blade and a uniform, strong and durable grade of hoes may be produced.

With the foregoing and other objects in view which will appear as the description proceeds, the invention resides in the method or process of manufacturing hoes as hereinafter described and claimed, it being understood that the method may be modified, changed, and carried out in various ways within the scope of the claim without departing from the spirit of the invention.

One convenient form of apparatus by means of which the process may be carried into effect, is illustrated in the accompanying drawings forming part of this specification, in which, Figure 1 is a front elevation of one form of machine for carrying the method into effect. Fig. 2 is a vertical sectional view of the same. Fig. 3 is a horizontal sectional view taken on the line 3—3 of Fig. 2. Fig. 4 is an elevation of a hoe blade with an unformed eye mounted thereon. Fig. 5 is a similar view showing the eye partially formed. Fig. 6 is a similar view showing the eye completely formed. Fig. 7 is an edge elevation of the hoe blade showing the eye completely formed and properly set. Fig. 8 is a sectional view of a portion of the hoe blade showing the pitch of the eye with relation to the blade when the eye is properly set. Fig. 9 is a transverse sectional view of a portion of the hoe blade set at right angles to the view illustrated in Fig. 8. Fig. 10 is an edge elevation of the hoe blade showing the eye attached thereto before the eye is shaped and set.

In order to facilitate an understanding of the invention, the method will first be briefly described, and a fuller description will later be given in connection with the machine.

The blade of the hoe is formed from a blank 1 which may be of any desired size and configuration. An approximate semicircular recess 2 preferably is cut at the middle of the upper edge portion of the blank 1 and divides the upper portion of the said blank into lobes 3. The eye 4 which is roughly shaped or flattened as shown and is provided with the rough web 5, is first, partly connected or crudely welded onto the blade 1 as shown in Fig. 4, so that the blade and rough eye can be readily handled together. The eye as thus partly connected with the blank 1 is located at a point about midway between the ends of the recess 2 in the upper edge of the blank 1 and projects beyond the upper edge of the said blank. The object in having the eye in the flat elongated condition as stated when first applied to the blank 1 is that its opposite sides are in compact relation and thus ample room is provided in order that a workman may thoroughly beat the metal constituting the web 5 down to weld the same upon the face of the blank 1.

The next step in the method is to "set" the eye to give it the proper angle to the blade. As this setting is usually performed by passing a mandrel into the rough eye so as to force it to proper position, it is convenient to "shape" the eye partially, at the same time that it is "set" as shown in Fig. 5. In other words, the insertion of the mandrel into the flattened eye in Fig. 4, to "set" the same, serves at the same time to spread and partially "shape" the eye as shown in Fig. 5. This partial shaping of the flattened eye causes it to spread out somewhat in the recess 2 as shown in Fig. 5.

The next two steps in the process, are, to completely "shape" the eye, and to "back" it up to the blade. It is convenient, though not essential, to perform these two steps at once by inserting a mandrel through the eye and at the same time applying external pressure to shape the eye and back it or force it toward the blade which is suitably held against movement, whereby the eye is simultaneously "shaped" and "backed up" or forced toward the blade and caused to fill the entire recess 2 as shown in Fig. 6. This "backing up" produces a tight fit between the recess 2 and the eye and causes them to be so securely welded as to be able to withstand the most severe tests of strength. The "backing up" also completes the "shaping" of the eye both interiorly and exteriorly. After the shaping and backing up, the core is withdrawn from the eye or conversely the eye is slipped from the core and the hoe blade is completed in so far as attaching the eye and giving the same a proper set and shape is concerned.

The machine for carrying the foregoing method into effect is illustrated in Figs. 1, 2 and 3 of the drawings and preferably consists of a stand 10 upon which is mounted a frame 11. A crank shaft 12 is journaled for rotation in the upper part of the frame 11 and a shaft 13 is journaled for rotation at the intermediate portion of the said frame 11. A belt pulley 14 is fixed to the shaft 13 as is also the pinion 15. The pinion 15 meshes with a gear wheel fixed to the end of the crank shaft 12. A block 17 is located upon the stand 10 and is provided at its outer edge with a recess 18 and at its inner edge with a recess 19. A disk 20 is fixed to that end of the shaft 12 which is located over the block 17 and a head 21 is slidably mounted in guides 22 attached to the frame 11. A link 23 operatively connects the hinge 20 with the said head 21 and a setting tool 24 is attached to the lower end of the head 21. After the eye 4 has been partially welded or attached to the blank 1 as has heretofore been described and as shown in Fig. 4, and while the said eye is in its unshaped position, the blank 1 is placed upon the block 17 and may be held thereon with tongs in the hands of an operator, the recess 18 affording room to permit the tongs to remain in contact with the said blank while the blank is in position upon the block. When the blank is placed upon the block 17 as indicated the eye 4 projects into the recess 19 at the back of the said block. As the shaft 12 rotates the head 21 is moved down between the guides 22 and the setting tool 24 enters the eye 4 and sets the same with relation to the plane of blade 1 and partially forms or shapes the inner portion of the eye 4 causing the sides of the said eye to spread and approximately fill the recess 2 at the upper edge of the blank 1. At this stage of the method the blank 1 and eye 4 have an appearance similar to that illustrated in Fig. 5 of the drawings. A block 25 is also located upon the stand 10 and is provided at its outer edge with a recess 26 and at its inner edge with a recess 27. Adjustable stops 28 are mounted upon the upper surface of the said block 25. A head 29 is mounted for reciprocation in guides 30 attached to the frame 11 and a rod 31 operatively connects the block 25 with the crank of the shaft 12. A shaping core 32 is attached to the head 29 and when the said head descends the said core is projected into the recess 27 at the back of the block 25. Rods 33 pass vertically through the head 29 and at their lower ends carry a stripper plate 34 which is provided with an opening which receives the shaping core 32. Stops 35 are attached to the upper portions of the guides 30 and are located in the paths of movement of the upper ends of the rods 33. A wedge member 36 is attached to the rear portion of the head 29 by means of a pivoted connection and the lower portion of the said wedge member 36 lies against the periphery of a cam 37 fixed to a shaft 38 journaled in the frame 11. A handle 39 is attached to one end of the shaft 38 and the frame 11 is provided with a series of perforations 40 any one of which is adapted to receive the pin 41 which when inserted in the said perforations is adapted to limit or check the movement of the handle 39 and thus hold the shaft 38 against rotation. A shaping press block 43 is slidably mounted behind the block 25 and is provided at its forward edge with a recess 44. An upstanding pin 45 is mounted upon the press block 43 and a spring 46 bears at its ends against the sides of the frame 11 and the intermediate portion of the said spring lies in the path of movement of the pin 45.

After the parts of the hoe have been assembled into the position shown in Fig. 5 of the drawings, the blank 1 is placed upon the block 25 with the lower edge of the blank against the adjustable stop 28. When this is done the eye 4 will lie within the recess 27 at the back of the block 25. The recess 26 is provided in order that sufficient room is afforded to enable a workman to retain his tongs upon the blank 1 while it is being operated upon finally. After the said blank has been positioned upon the block 25 as indicated, the shaft 12 rotates and the shaping core 32 is passed down through the partially completed or shaped eye 4 of the hoe blade. Simultaneously with the downward movement of the shaping core 32 the shaping press block 43 is moved toward the block 25 by the downward movement of the wedge 36 against the periphery of the cam 37 and thus the material at the back portion of the eye 4 is pressed into shape against the side of the shaping core 32 and the eye is "backed up" into the recess 2 of the blade, so that the parts are completed as shown in Figs. 6 and 7. By simultaneously finishing and backing the eye and blade together the blade is partly embedded in or interfitted with the eye and a strong joint is produced.

Upon the retractive movement of the head 29 and shaping core 32 the shaping block 43 is moved away from the block 25 by the pick up energy of the spring 46 operating against the pin 45. The wedge 36 moves in an upward direction so that the said block 43 may move rearwardly as stated. When the upper end of the rod 33 comes in contact with the stops 35 the head 29 and the shaping core 32 continue their upward movement while the said rod comes to a state of rest as does also the stripping plate 34. Thus as the shaping core 32 moves up through the stripping plate, the plate comes in contact with the upper edge of the eye 4 and slips the same from the lower portion of the core 32.

It will be noted that during the final shaping and backing up operation, the blade is held by the stops 28, the front of the eye is in the recess 27, the rear of the eye is in the recess 44 of the backing up member 43, and the mandrel 32 is in the center of the eye. The parts of the hoe therefore are squeezed and forced together and into shape from all sides, and the resulting weld between the eye and the blade is practically unbreakable, moreover, the eye itself will stand the roughest treatment without serious injury.

What is claimed is:

The method of making hoes, consisting in forming a blade portion having a semi-circular recess in one edge, forming an eye portion provided with a rough or unfinished eye, and a web, heating and assembling these parts, crudely or temporarily welding said portions together with the side of the eye abutting the wall of the recess in the blade, and finally inserting a mandrel in the rough eye to expand it and cause it to fill the recess in the blade and simultaneously apply pressure to firmly weld the parts and spread the web.

In testimony that I claim the foregoing as my own, I have hereto affixed my signature in the presence of two witnesses.

ELMER P. ALEXANDER.

Witnesses:
  LEWIS H. RUBLE,
  JOHN A. DAVIDSIZER.

---

Copies of this patent may be obtained for five cents each, by addressing the "Commissioner of Patents, Washington, D. C."